(12) United States Patent
Baluja et al.

(10) Patent No.: US 8,498,490 B1
(45) Date of Patent: *Jul. 30, 2013

(54) SELECTION OF AN IMAGE OR IMAGES MOST REPRESENTATIVE OF A SET OF IMAGES

(75) Inventors: Shumeet Baluja, Santa Clara, CA (US); Yushi Jing, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/301,449

(22) Filed: Nov. 21, 2011

Related U.S. Application Data

(63) Continuation of application No. 11/560,246, filed on Nov. 16, 2006, now Pat. No. 8,090,222.

(51) Int. Cl.
*G06K 9/68* (2006.01)
*G06F 7/00* (2006.01)

(52) U.S. Cl.
USPC ........................................... 382/218; 707/723

(58) Field of Classification Search
USPC .................. 382/162, 218, 219, 224, 305, 312, 382/190, 201, 209, 214; 345/420; 707/705–708, 707/711, 713, 718, 723, 748
See application file for complete search history.

(56) References Cited

U.S. PATENT DOCUMENTS

| | | | |
|---|---|---|---|
| 5,893,095 A | 4/1999 | Jain et al. | |
| 5,911,139 A * | 6/1999 | Jain et al. | 1/1 |
| 5,913,205 A * | 6/1999 | Jain et al. | 1/1 |
| 5,915,250 A | 6/1999 | Jain et al. | |
| 5,983,237 A * | 11/1999 | Jain et al. | 1/1 |
| 6,594,386 B1 * | 7/2003 | Golshani et al. | 382/166 |
| 6,847,733 B2 * | 1/2005 | Savakis et al. | 382/225 |
| 7,035,467 B2 | 4/2006 | Nicponski | |
| 7,167,574 B2 * | 1/2007 | Kim | 382/100 |
| 7,379,627 B2 * | 5/2008 | Li et al. | 382/305 |
| 7,386,170 B2 * | 6/2008 | Ronk et al. | 382/190 |
| 2005/0142529 A1 | 6/2005 | Andreyev et al. | |
| 2006/0165277 A1 | 7/2006 | Shan et al. | |
| 2006/0204142 A1 | 9/2006 | West et al. | |
| 2007/0036371 A1 | 2/2007 | Buil et al. | |
| 2007/0288462 A1 | 12/2007 | Fischer et al. | |

OTHER PUBLICATIONS

Co-pending U.S. Appl. No. 11/560,246, filed Nov. 15, 2006, and titled "Selection of an Image or Images Most Represented of a Set of Images," 41 pages.

Rothganger et al., "3D Object Modeling and Recognition Using Local Affine-Invariant Image Descriptors and Multi-View Constraints," Department of Computer Science and Beckman Institute, 2006, pp. 1-47.

(Continued)

*Primary Examiner* — Kanjibhai Patel
(74) *Attorney, Agent, or Firm* — Harrity & Harrity, LLP

(57) ABSTRACT

Implementations consistent with the principles described herein relate to ranking a set of images based on features of the images determine the most representative and/or highest quality images in the set. In one implementation, an initial set of images is obtained and ranked based on a comparison of each image in the set of images to other images in the set of images. The comparison is performed using at least one predetermined feature of the images.

20 Claims, 7 Drawing Sheets

OTHER PUBLICATIONS

Grauman et al., "The Pyramid Match Kernel: Discriminative Classification with Sets of Image Features," Massachusetts Institute of Technology, Computer Science and Artificial Intelligence Laboratory, Cambridge, MA USA, in Proceedings of the IEEE International Conference on Computer Vision, Beijing, China, Oct. 2005, 8 pages.

Lowe, "Distinctive Image Features from Scale-Invariant Keypoints," Computer Science Department, University of British Columbia, Vancouver, B.C., Canada, Jan. 2004, 28 pages.

Mikolajczyk et al., "A Performance Evaluation of Local Descriptors," Department of Engineering Science, University of Oxford, Oxford, United Kingdom, Oct. 6, 2004, 33 pages.

Ke et al., "PCA-SIFT: A More Distinctive Representation for Local Image Descriptors,", Proceedings of Computer Vision and Pattern Recognition, 2004. http://www.cs.cmu.edu/~rahuls/pub/cvpr2004-keypoint-rahuls.pdf.

Dalal et al., "Histograms of Oriented Gradients for Human Detection," Proceedings of IEEE Conference Computer Vision and Pattern Recognition, San Diego, USA, pp. 886-893, Jun. 2005. http://www.vis.uky.edu/~dnister/Teaching/CS684Fall2005/HOG.pdf.

Brown et al., "Recognizing Panoramas," Proceedings of the ICCV, 2003. http://www.cs.ubc.ca/nest/lci/papers/2003/brown03.pdf.

Vogelhuber et al., "Face Detection Based on Generic Local Descriptors and Spatial Constraints," ICCV 2000. ftp://ftp.inrialpes.fr/pub/movi/publications/VogelhuberSchmid-icpr00.ps.gz.

Lowe, "Local Feature View Clustering for 3D Object Recognition," CVPR 2001, http://www.cs.ubc.ca/~lowe/papers/cvpr01.pdf.

\* cited by examiner

SELECTION OF AN IMAGE OR IMAGES MOST REPRESENTATIVE OF A SET OF IMAGES

RELATED APPLICATION

This application is a continuation of U.S. patent application Ser. No. 11/560,246, filed Nov. 15, 2006, the contents of which are incorporated herein by reference.

BACKGROUND

A. Field of the Invention

Implementations described herein relate generally to information retrieval and, more particularly, to improving results of image search engines.

B. Description of Related Art

The World Wide Web ("web") contains a vast amount of information. Search engines assist users in locating desired portions of this information by cataloging web pages. Typically, in response to a user's request, the search engine returns references to documents relevant to the request.

One type of search engine is an image search engine. An image search engine, such as a web-based image search engine, catalogs images from the web. Typically, the image search engine may associate text, such as text that occurs near a particular image, with the image. The text associated with the images may then be searched using conventional keyword based search queries to locate images relevant for the search.

When a user enters a search query for images in an image search engine, the search engine may return hundreds of results (e.g., images or links to images). The large number of potentially relevant results can be daunting for the user. Additionally, because the relevancy of the results may be primarily determined based on text associated with the image, such as by text near the image in a web page, the image itself may not match the search or may be of relatively low quality. For example, a search for "Eiffel Tower" may result in some images that include the Eiffel Tower while others may not. Of the images that contain the Eiffel Tower, some may be images taken at odd poses or odd croppings of the Eiffel Tower, or the Eiffel Tower may not be the main focus of the image (for example, the image may primarily be a picture of a person standing at the base of the Eiffel Tower, with the Eiffel Tower only minimally visible in the background).

It is a goal of an image search engine to return relevant and high quality images to the user. Accordingly, it would be desirable to more effectively determine the quality of images returned to the user.

SUMMARY

One aspect is directed to a method of providing images. The method may include obtaining an initial set of images; ranking the initial set of images based on a comparison of each image in the set of images to other images in the set of images, the comparison being performed using at least one predetermined feature of the images; selecting at least one of the images in the initial set of images based on the ranking; and providing the selected images or links to the selected images to a user.

Another aspect is directed to a computer-implemented method of ranking images. The method may include receiving selection of an image feature to use in ranking the images; receiving selection of a comparison function to use for the image feature; receiving an initial set of images; comparing the selected image feature for a first image in the set of images to other images in the set of images using the comparison function; and generating a ranking score for the first image, the ranking score quantifying how much the first image is representative of the set of images.

Yet another aspect is directed to a system comprising a server connected to a network to receive a search query from a user via the network. The server may include at least one processor; a database to store descriptive text of images in a corpus; and a memory operatively coupled to the processor. The memory may store program instructions that when executed by the processor, cause the processor to generate an initial set of images relevant to the search query based on a matching of terms in the search query to the descriptive text stored in the database; generate a ranking score for each of the images in the generated set of images based on comparisons of features associated with each of the images to corresponding features in other images of the set of images; and return a result set of images or links to images to the user, the order of the images in the result set being determined at least in part by the ranking scores for each of the images.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description refers to the accompanying drawings. The detailed description does not limit the invention.

Overview

Implementations consistent with the principles described herein relate to ranking an initial set of images, such as a set of images returned from a conventional image search engine, to determine the most representative and/or highest quality images in the initial set. Image results returned to a user may be presented in a manner that emphasizes the more representative/higher quality images.

Figure 1:
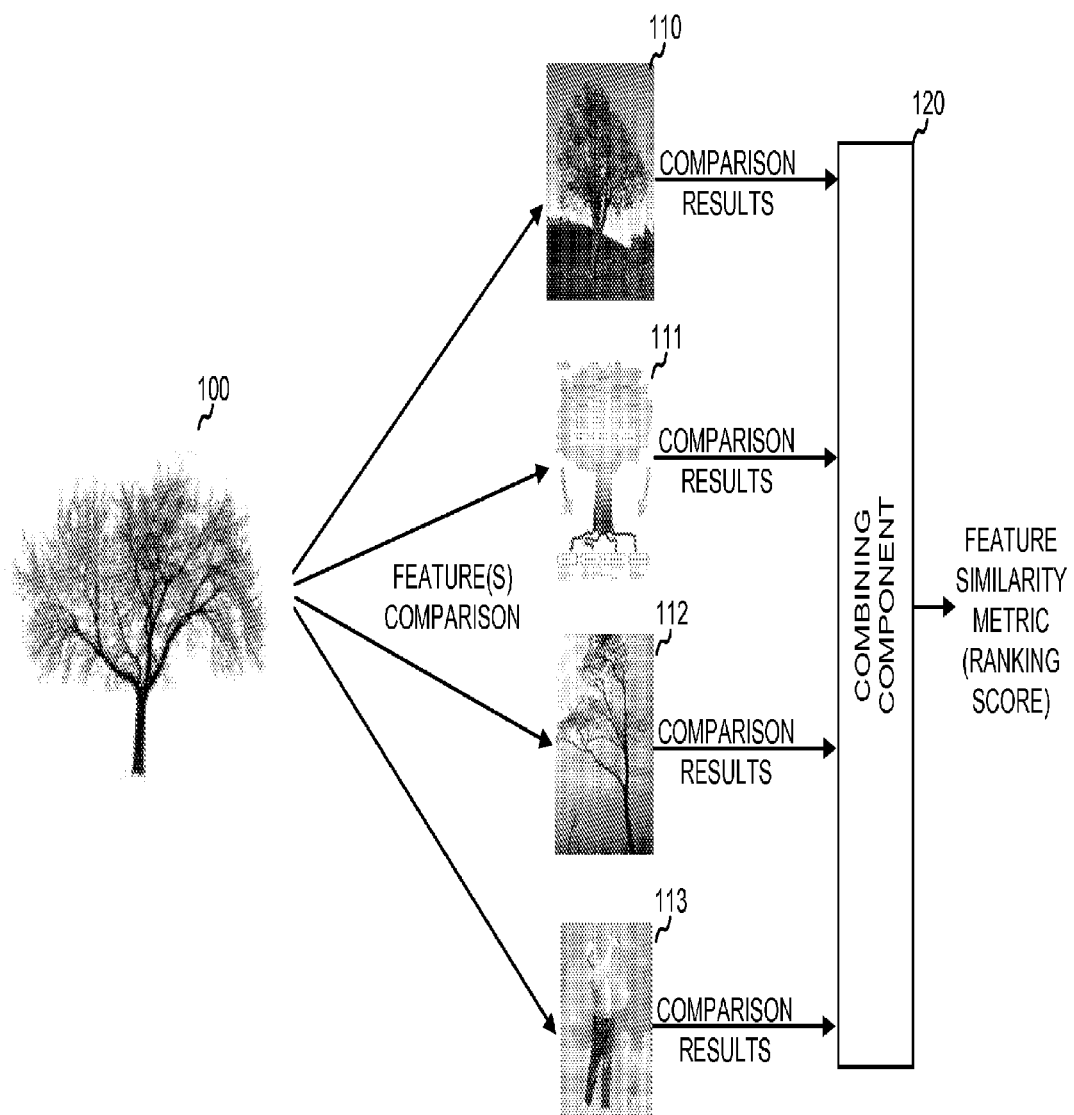
FIG. 1 is a diagram providing a conceptual overview of concepts described herein.

FIG. 1 is a diagram that provides a conceptual overview of concepts described herein. In this example, assume that a user entered the image search query "tree." For simplicity, assume that five images 100 and 110-113 are located in response to this image search using conventional image search techniques in which the search query is compared to text associated with each of images 100 and 110-113 (e.g., text taken from the file name of the image). It can be appreciated that images 100 and 110-112 may be considered appropriate responses to the image query. Image 113 is clearly not an appropriate image. Image 113 may have been included in the results because, for example, the caption or article associated with the image described a golfer hitting a ball into trees.

Consistent with aspects described herein, one of the images, such as image 100, may be compared to each of the other images 110-113. This comparison may be based on features of the images themselves. A number of different possible image features may be used. For example, the feature comparison may be based on intensity or color histograms of the images, edge based features of the images, or other features of the images. The comparison results may be combined, shown by combining component 120 in FIG. 1, to produce a combined feature similarity metric (also called ranking score herein) for image 100.

Images 110-113 may be processed similarly as image 100 to obtain a feature similarity metric for each of images 110-113. Images 100 and 110-113 may then be ranked based on these feature similarity metrics. Ideally, images 100, 110, and 112 would have the highest similarity ranks and would thus be considered the most representative and/or highest quality images. Image 113 should have the lowest similarity rank and may be considered the least representative and/or lowest quality image.

Images 100 and 110-113 may be presented to the user in a visual order based on their similarity ranks. Additionally or alternatively, low ranking ones of images 100 and 110-113 may be removed from the set of images presented to the user.

Exemplary Network Overview

Figure 2:
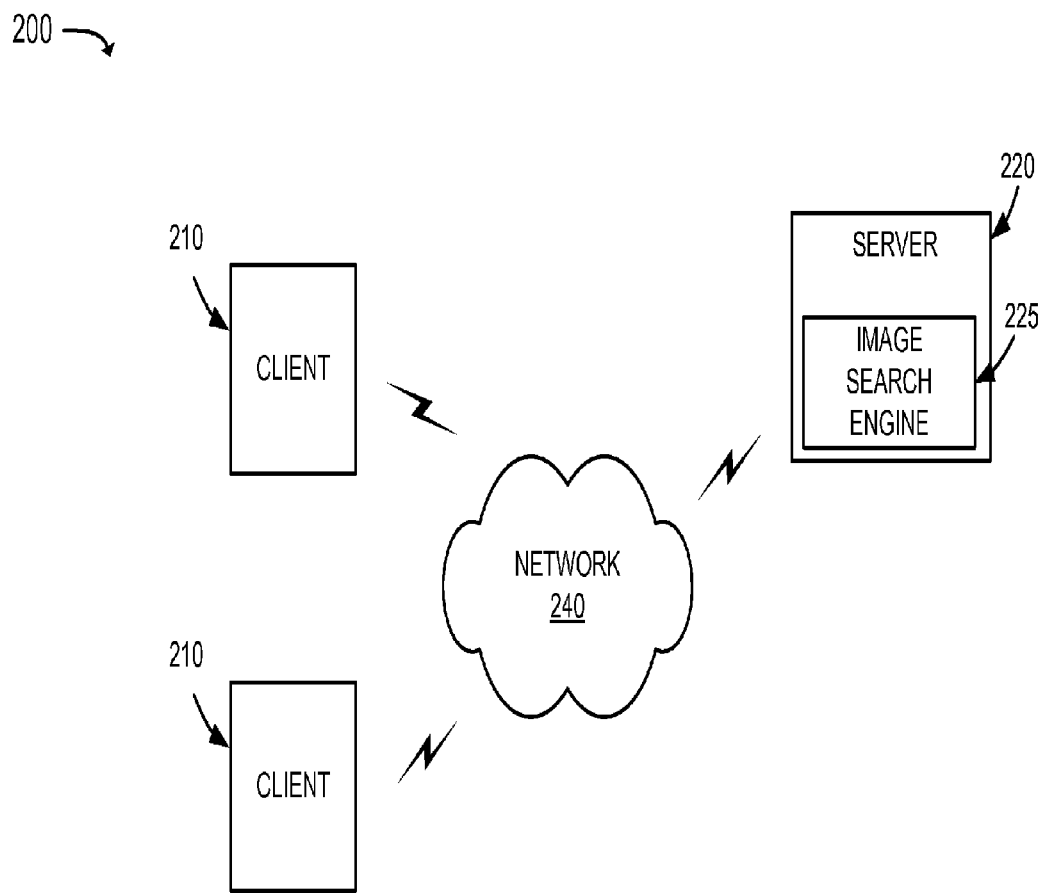
FIG. 2 is an exemplary diagram of a network in which implementations described herein may be implemented.

FIG. 2 is an exemplary diagram of a network 200 in which implementations described herein may be implemented. Network 200 may include multiple clients 210 connected to a server 220 via a network 240. Network 240 may include a local area network (LAN), a wide area network (WAN), a telephone network, such as the Public Switched Telephone Network (PSTN), an intranet, the Internet, or a combination of networks. Two clients 210 and one server 220 have been illustrated as connected to network 240 for simplicity. In practice, there may be more clients and/or servers. Also, in some instances, a client may perform one or more functions of a server and a server may perform one or more functions of a client.

A client 210 may include a device such as a wireless telephone, a personal computer, a personal digital assistant (PDA), a lap top, or another type of computation or communication device, a thread or process running on one of these devices, and/or an object executable by one of these devices. Server 220 may include a server device that processes, searches, and/or maintains documents and images in a manner consistent with the principles of the invention. Clients 210 and server 220 may connect to network 240 via wired, wireless, or optical connections.

Server 220 may include an image search engine 225 usable by clients 210. In general, in response to a client request, image search engine 225 may return images to the client that are relevant to the client requests.

Exemplary Client/Server Architecture

Figure 3:
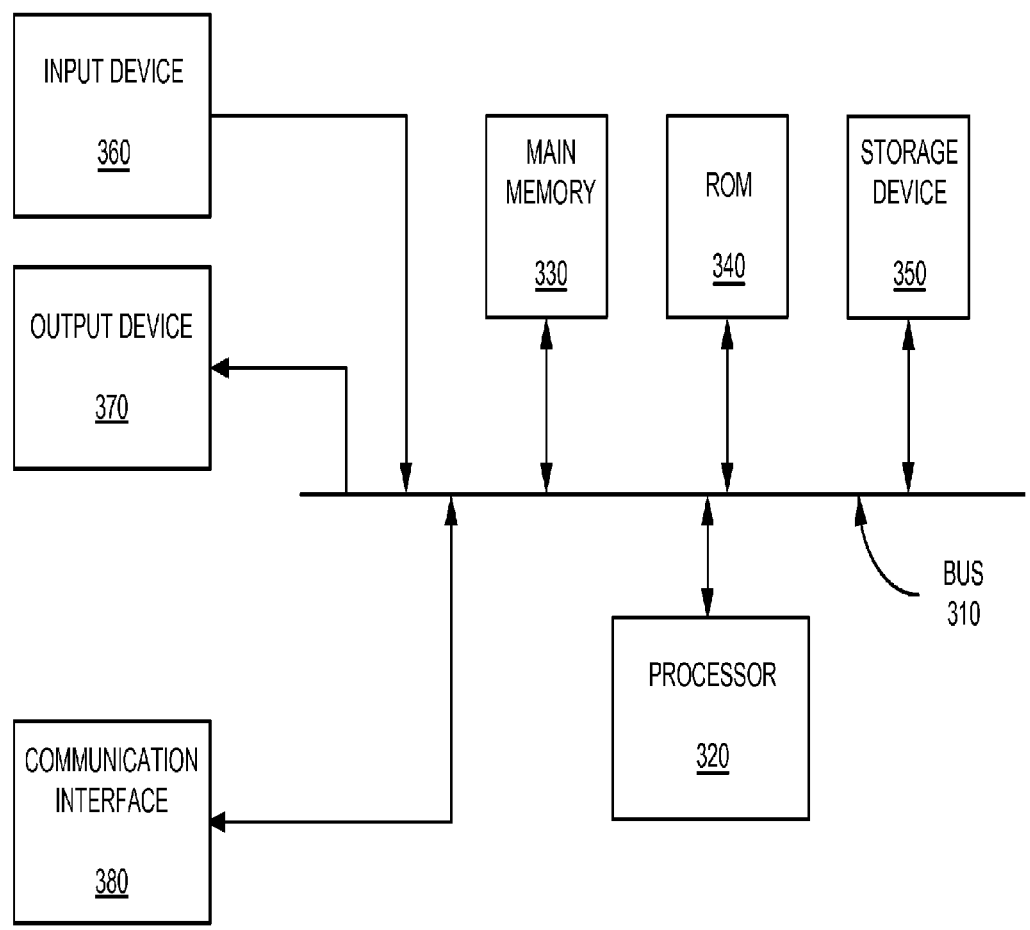
FIG. 3 is an diagram of an exemplary client or server shown in FIG. 2.

FIG. 3 is an diagram of an exemplary client 210 or server 220. Client/server 210/220 may include a bus 310, a processor 320, a main memory 330, a read only memory (ROM) 340, a storage device 350, an input device 360, an output device 370, and a communication interface 380. Bus 310 may include conductors that permit communication among the components of client/server 210/220.

Processor 320 may include a processor(s), a microprocessor(s), or processing logic that interpret and execute instructions. Main memory 330 may include a random access memory (RAM) or another type of dynamic storage device that stores information and instructions for execution by processor 320. ROM 340 may include a conventional ROM device or another type of static storage device that stores static information and instructions for use by processor 320. Storage device 350 may include a magnetic and/or optical recording medium and its corresponding drive.

Input device 360 may include one or more mechanisms that permit a user to input information to client/server 210/220, such as a keyboard, a mouse, a pen, voice recognition and/or biometric mechanisms, etc. Output device 370 may include one or more mechanisms that output information to the user, including a display, a printer, a speaker, etc. Communication interface 380 may include any transceiver-like mechanism that enables client/server 210/220 to communicate with other devices and/or systems. For example, communication interface 380 may include mechanisms for communicating with another device or system via a network, such as network 240.

As will be described in detail below, server 220 may implement image search engine 225. Image search engine 225 may be stored in a computer-readable medium, such as memory 330. A computer-readable medium may be defined as one or more physical or logical memory devices.

The software instructions defining image search engine 225 may be read into memory 330 from another computer-readable medium, such as data storage device 350, or from another device via communication interface 380. The software instructions contained in memory 330 may cause processor 320 to perform processes that will be described later. Alternatively, hardwired circuitry or other logic may be used in place of, or in combination with, software instructions to implement processes consistent with the invention. Thus, embodiments described are not limited to any specific combination of hardware circuitry and software.

Image Search Engine 225

Figure 4:
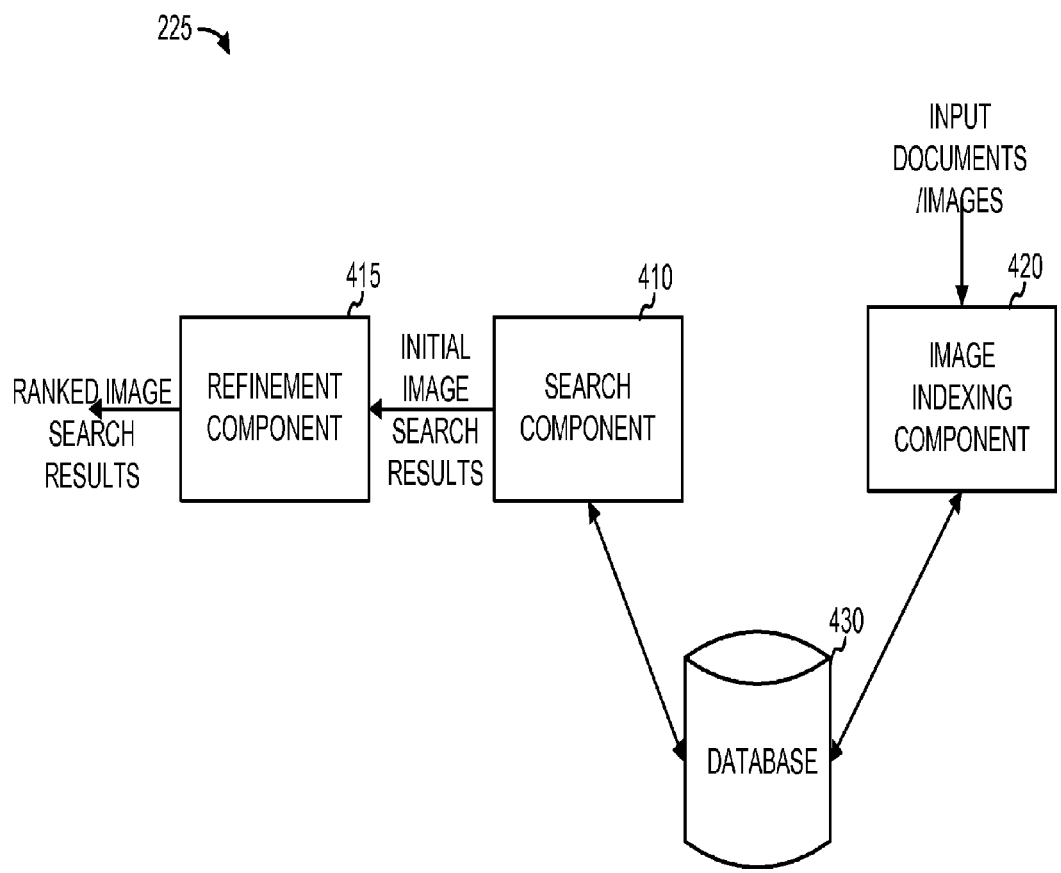
FIG. 4 is a functional block diagram illustrating an implementation of the image search engine shown in FIG. 2.

FIG. 4 is a functional block diagram that illustrates an implementation of image search engine 225. Image search engine 225 may include a search component 410, a refinement component 415, an image indexing component 420, and a database 430. In general, image indexing component 420 may receive input documents, such as HTML web pages retrieved from the web, and parse the input documents for text and images that are to be included in potential results of search engine 225. In one implementation, image indexing component 420 may store images, or links to images, and image descriptive text in database 430.

Database 430 generally stores a collection of data. Database 430 may be implemented as, for example, a relational or non-relational database capable of storing and accessing data. Database 430 may be implemented on a single computing device or distributed across many computing devices and/or storage devices.

Search component 410 may receive user search queries, such as from clients 210, search database 430 for results based on the search queries, and generate relevant results (i.e., images or links to images) based on a comparison of the search query to the descriptive text for the images that are stored in database 430. In other words, search component 410 may generally match terms in the search query to the descriptive text associated with the images.

Consistent with aspects described herein, the initial search results from search component 410 may be processed by refinement component 415. Refinement component 415 may generally operate to rank the initial search results based on features of the images. Ideally, refinement component 415 will rank the image search results returned by search component 410 so that the images that are most representative of the initial image search results are ranked higher than less representative or lower quality images. The rankings generated by refinement component 415 may be used, for example, to identify the most representative image corresponding to the search query.

One of ordinary skill in the art will recognize that although image search engine 225 is illustrated as containing search component 410, refinement component 415, image indexing component 420, and database 430, these elements may be physically implemented on different computing devices and may only be loosely coupled to one another. In some implementations, image indexing component 420 may be thought of as being essentially separate from the search component and refinement component portion of search engine 225, in which image indexing component 420 receives and processes input documents/images independently of search component 410 and refinement component 415.

Refinement Component 415

Figure 5:
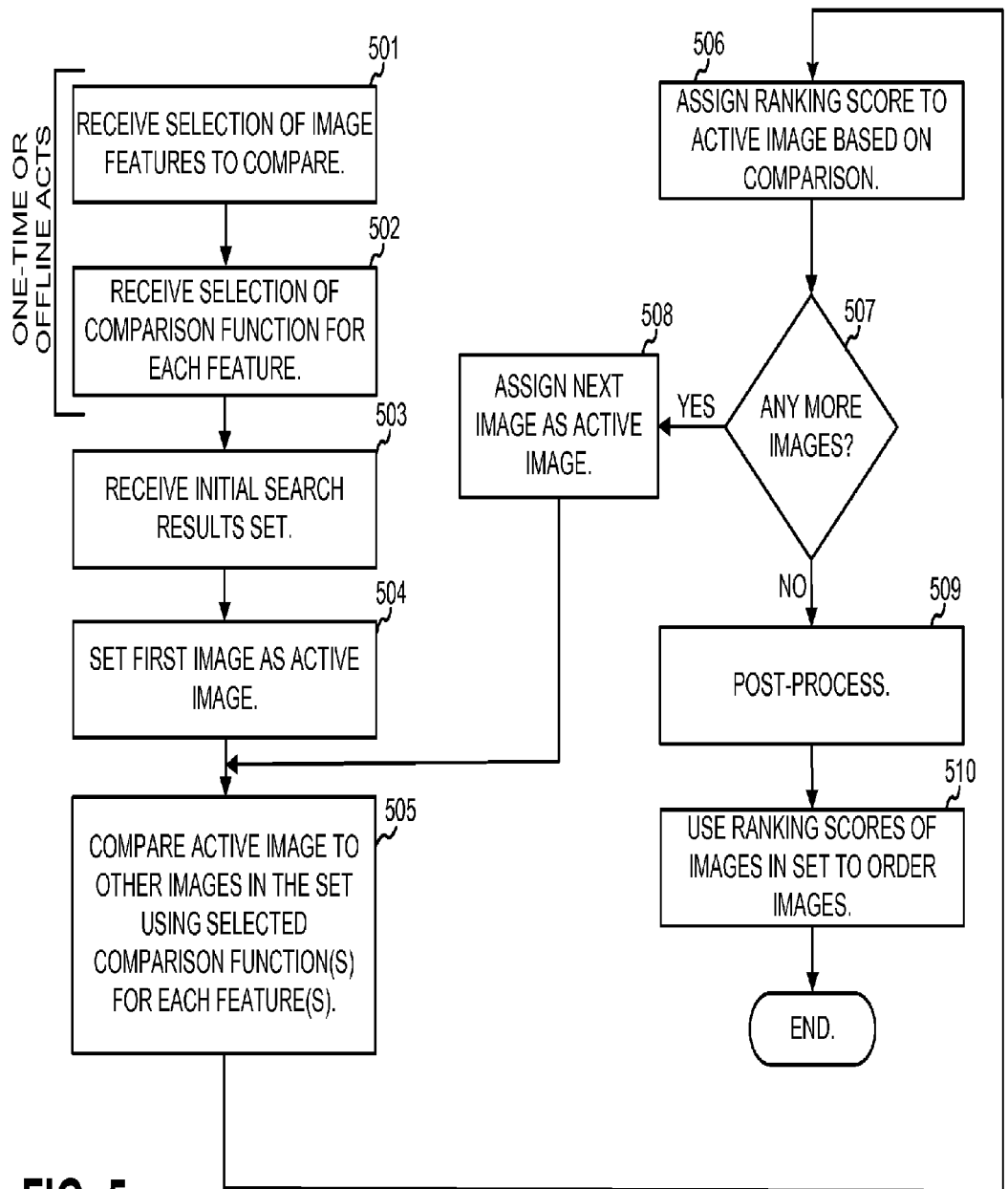
FIG. 5 is a flow chart illustrating exemplary operations that may by performed by the refinement component shown in FIG. 4.

Refinement component 415 will now be described in additional detail. FIG. 5 is a flow chart illustrating exemplary operations that may by performed by refinement component 415. In general, as was briefly mentioned above, refinement component 415 compares images in a set of images to one another on an image feature basis. Based on the comparison, refinement component 415 may rank the images so that images more representative of the set move to the top of the ranking.

A number of different image features may be used to compare the images. The particular image features to use may be decided ahead of time or offline by an administrator.

Refinement component 415 may receive the selection of which features to use (act 501). Examples of image features that may be used include image features based on, for example, intensity, color, edges, texture, wavelet based techniques, or other aspects of the image. For example, regarding intensity, each image may be divided into small patches (e.g., rectangles, circles, etc.) and an intensity histogram computed for each patch. Each intensity histogram may be considered to be a feature for the image. Similarly, as an example of a color-based feature, a color histogram may be computed for each patch (or for different patches) within each image. A color histogram can be similarly computed to obtain a possible color-based histogram. The color histogram may be calculated using any known color space, such as the RGB (red, green, blue) color space, YIQ (luma (Y) and chrominance (IQ)), or another color space.

Histograms can also be used to represent edge and texture information. For example, histograms can be computed based on patches of edge information or texture information in an image. For wavelet based techniques, a wavelet transform may be computed for each patch and used as an image feature.

The features discussed above represent an exemplary list of possible image features that may be used. Other image features, such as features identified using the known Scale-Invariant Feature Transform (SIFT) may be used.

In some implementations, to improve computation efficiency, features may be computed only for certain areas within images. For example, "objects of interest" within an image may be determined and image features may only be computed for the objects of interest. For example, if the image feature being used is a color histogram, a histogram may be computed for each patch in the image that includes an object of interest. Objects of interest within an image can be determined in a number of ways. For example, for color, objects of interest may be defined as points where there is high variation in color (i.e., areas where color changes significantly). In general, objects of interest can be determined mathematically in a variety of ways and are frequently based on determining discontinuities or differences from surrounding points. The SIFT algorithm is an example of one technique for locating objects of interest.

Additionally, in some implementations, the various features described above may be computed using different image scales. For example, an image can be examined and features computed in its original scale and then features may be successively examined at smaller scales. Additionally or alternatively, features may be selected as features that are scale invariant or invariant to affine transformations. The SIFT techniques, for example, can be used to extract distinctive invariant objects from images. The extracted objects are invariant to image scale and rotation.

For each feature that is to be used, a comparison function may be selected. A number of different comparison functions may be used to compare images. The particular comparison function to use may be decided ahead of time or offline by an administrator. Refinement component 415 may receive the selection of the comparison functions (act 502).

In general, a comparison function may operate to generate a value defining a similarity between a particular feature computed for two images. As an example of a possible comparison function, consider a simple histogram comparer function, which is described in pseudo-code in Table I, below. As shown in Table I, the histogram comparer function returns a value that is the sum of the absolute values of the differences between corresponding bins in the input histograms. Smaller values returned from this function indicate greater similarity between the input histograms.

TABLE I

Compare_histogram_type_features(histogram1,histogram2)
   Difference = 0;
   For all bins, b, in histogram:
      Difference = Difference + |histogram1[b] −
      histogram2[b]|
   Return(Difference).

The histogram comparer function is exemplary. It can be appreciated that other comparison functions can be used to compare histograms. For example, squared differences may be used rather than absolute differences, bin correlations may be taken into account instead of absolute differences, or percent differences may be used instead of absolute differences. Additionally, for image features other than those based on histograms, different comparison functions may, of course, be used.

The selection of the image features to use and the comparison functions to use (acts 501 and 502) may be performed offline or in non-runtime operation. For example, an administrator may initially design or configure refinement component 415 to use one or more image features and one or more comparison functions. After these initial acts, refinement component 415 may function in a runtime mode (acts 503-

510) to rank a set of input images, such as images returned in an initial image search result set from search component 410.

In one possible implementation, the selection of image features to use and the comparison functions to use (acts 501 and 502) may define a set of possible image features and comparison functions. During runtime operation, the set of possible image features and comparison functions may be dynamically narrowed. For example, the number of matches for a feature across the images for that feature may be used as a measure as to whether the feature is interesting. Assume, for instance, that the user query "black and white pictures of the london tower" initially generated a number of black and white images. With this set of images, using a color histogram as a feature is not likely to be very helpful. However, other features, such as edge-based features, may play a more important part as they may be more distinguishing. A number of techniques may be used to determine whether a feature is interesting for a set of images, such as techniques based on the variation, distribution, or entropy in the responses across images for a feature.

Refinement component 415 may begin runtime operation by receiving an initial image search result set (act 503). For example, in response to an image search query from a user, search component 410 may return an initial set of images, or links to images, using existing techniques based on matching terms in the search query to terms associated with each image. Refinement component 415 may receive the top N image hits (for example, N may be 1000) from search component 410.

Refinement component 415 may set the first received image as the active image (act 504). The active image may then be compared to each other image in the set of images (act 505). The comparison may be based on the image features from act 501 and may be performed using the comparison functions from act 502.

An exemplary implementation of act 505 is shown in pseudo-code in Table II, below. In Table II, the final feature similarity metric (ranking score) is tabulated in the variable "image_score."

TABLE II

```
image_score = 0
For each feature F_i of active image i:
    For each image j (where j is not i):
        For each feature F_j of image j that is of type F_i
            same_feature = compare_features(F_i, F_j)
            if same_feature < Threshold (e.g., 0.05, or a value that
                indicates the features are close or very
                close)
                image_score = image_score + 1
```

In the implementation of act 505 shown in Table II, each feature $F_i$ of the active image is compared with every feature $F_j$ of image j that is the same feature type. In other words, if $F_i$ is a color histogram then the comparison is performed with the color histogram features of image j, if $F_i$ is an edge histogram then the edge histogram features of image j are compared, etc.

Refinement component 415 may assign a ranking score to the active image based on the comparison of act 505 (act 506). For example, the "image_score" variable (see Table II) indicates how often the features in image i appear in other images and, in this implementation, represents the feature ranking score assigned to the active image. In this implementation, image_score was simply incremented whenever two features were found that were sufficiently similar and image_score was calculated across all features and all other images j. In other implementations, the ranking score may be calculated in other ways, such as by summing or combining the raw values returned by the comparison function (called "compare_features" in Table II). In general, the ranking score may be designed so that more similar image features will contribute more significantly to the ranking score. Also, in the operations shown in Table II, each image feature is weighted equally (i.e., image_score is incremented by one for each similar feature). In some implementations, different features may be weighted differently. For instance, color-based features may be less important than intensity or edge-based features. Accordingly, image_score may be incremented by one for matching color-based features and by more than one for matching intensity or edge-based features.

Acts 505 and 506 may be repeated for each image in the initial results set (acts 507 and 508) to thus obtain a ranking score for each image in the initial results set.

Acts 505-508 can be relatively computationally expensive, as it requires $N^2$ comparisons among the N images, and for each comparison, $M_i * M_j$ feature comparisons, for $M_i$ and $M_j$ local features in each image. Techniques are known that may potentially accelerate this type of operation. For example, one such technique is described in the publication "The Pyramid Match Kernel: Discriminative Classification with Sets of Image Features," K. Grauman et al., Proceedings of the IEEE International Conference on Computer Vision, Beijing, China, October 2005.

Additionally, it can be appreciated that to further increase run-time processing performance, the features used for each of the images may be pre-computed ahead of time and stored, for instance, in database 430. Additionally, for common search queries, not only can the features for each of the images be pre-computed, but the comparisons of the features can also be pre-calculated. In other words, for common search queries, acts 503-509 can be performed ahead of time and the ranking scores may be stored.

Post-processing may optionally be performed on the images to further refine the ranking scores and/or to eliminate certain images from the set of images (act 509). A number of possible post-processing operations may be performed.

Figure 6:
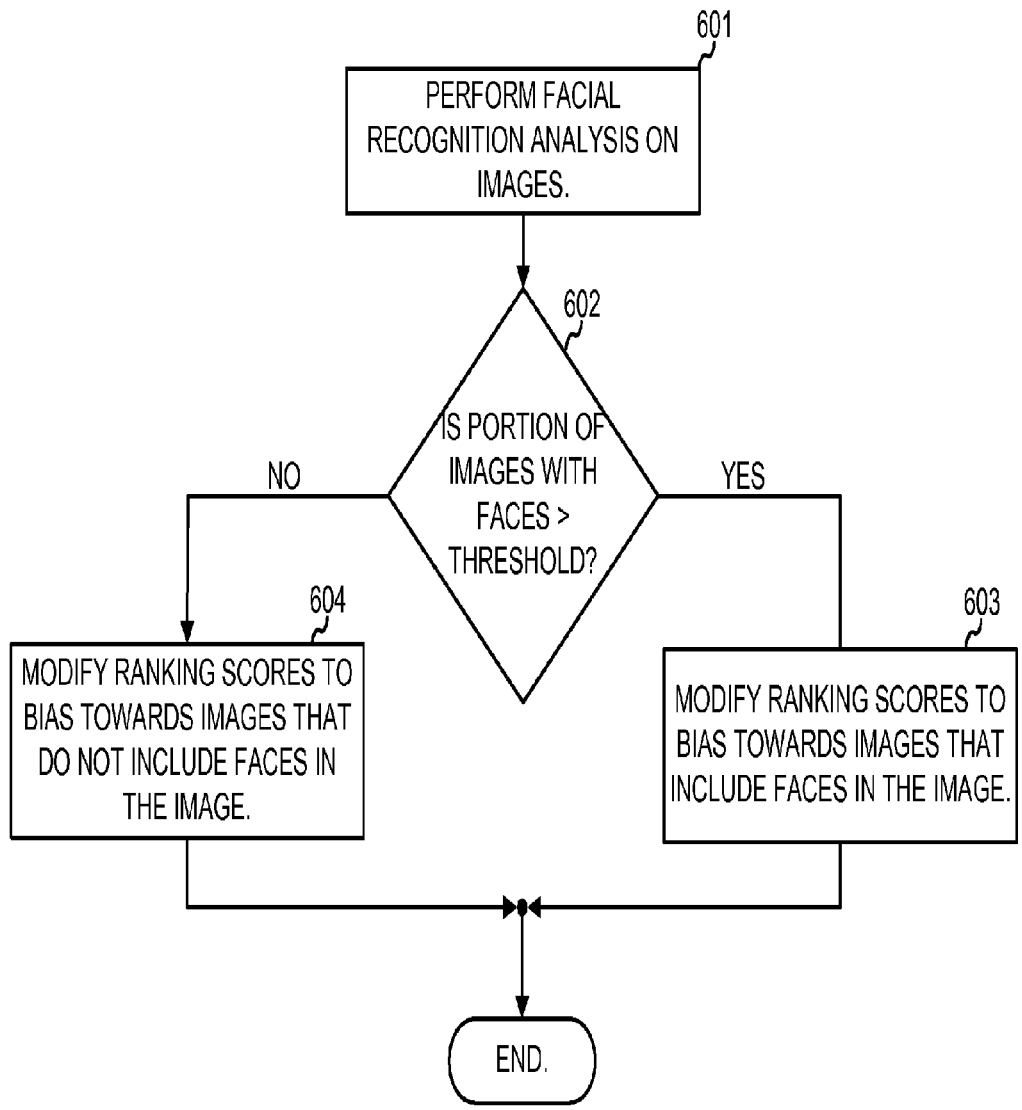
FIG. 6 is a flow chart illustrating exemplary post-processing operations that may be performed based on the use of facial detection techniques.

FIG. 6 is a flow chart illustrating exemplary post-processing operations that may be performed based on the use of facial detection techniques. Refinement component 415 may use facial detection techniques to determine whether an image includes a human face and whether the face (if present) is a dominant feature in the image. Image facial detection techniques are known in the art and can be used to determine whether a human face is present in an image and to locate the face in the image.

Refinement component 415 may perform facial detection analysis on the images in the active image set (act 601). From this analysis, refinement component 415 may thus determine which images include human faces and where in the images the human faces occur. Refinement component 415 may next determine if the number or portion of images in the set is greater than a threshold (act 602). For example, assume the threshold is set at 50%. If greater than 50% of the images in the set are determined to have faces, then the image search may be assumed to be a search that was intended to find an image of a person. In this case, refinement component 415 may bias or modify the ranking scores to emphasize the images that include faces (act 603). For example, images that include faces may have their ranking scores boosted in some manner. Additionally, images that include faces and in which the faces are dominant features of the images (e.g., the face or faces take up significant portion of the image), may be additionally boosted.

On the other hand, if less than the threshold portion of images were determined to include faces, than the image search may be assumed to be a search that was not intended to find images of people. In this case, refinement component 415 may bias or modify the ranking scores to emphasize the images that do not include faces (act 604).

Figure 7:
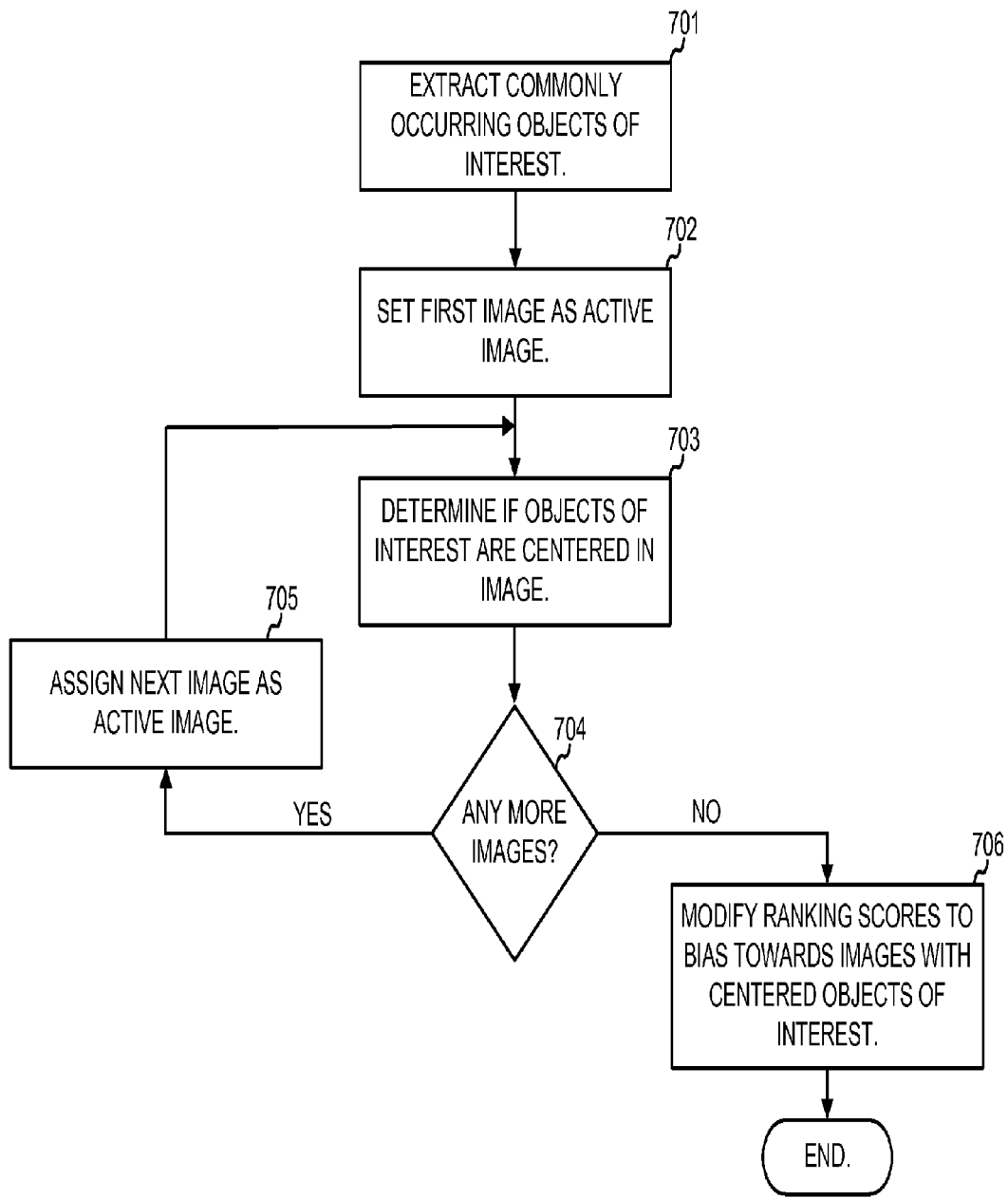
FIG. 7 is a flow chart illustrating exemplary operations of an additional possible post-processing technique.

FIG. 7 is a flow chart illustrating exemplary operations of another possible post-processing technique. In the operations shown in FIG. 7, images in the set of images may have their ranking scores modified based on whether objects of interest are centered in the image. Consider the situation in which a number of images of the Eiffel Tower are identified in response to an image search query for the Eiffel Tower. Some of the images that include the Eiffel Tower may include the Eiffel Tower as a secondary focus of the image. For instance, the Eiffel Tower may be visible in the distant background while the foreground of the image is dominated by a picture of person. This is not an ideal picture of the Eiffel Tower. The operations shown in FIG. 7 may boost the ranking scores of images that include objects of interest that tend to be centered in the image.

To begin, refinement component 415 may extract commonly occurring objects of interest from the set of images (act 701). In other words, refinement component 415 may analyze the set of images and determine objects of interest that tend to commonly occur in the set of images. Objects of interest may be determined by examining the configuration of the points of interest as found by using local-feature processing algorithms such as the well-known scale-invariant feature transform (SIFT) algorithm for extracting distinctive features from images. One property of the SIFT algorithm is that objects of interest may be extracted invariant to image scale and rotation.

An image may be set as the active image for the set of images and then it may be determined whether or how much the objects of interest tend to occur in or near the center of the image (acts 702 and 703). The "centerness" of the objects of interest may be quantified in some way by refinement component 415, such as, for example, by using a scale from zero to one, where zero indicates that there are no objects of interest near the center of the image and one indicates objects of interest are centered and dominant in the image. Act 703 may be repeated for each image in the set (acts 704 and 705).

In some situations, the best image for a particular scene may tend to include objects of interest that are not centered. For example, common images of the Golden Gate Bridge include the two towers that support the bridge. These two towers tend to be identified as objects of interest in images of the Golden Gate Bridge. The towers, however, are frequently not centered in the images of the Golden Gate Bridge. To handle situations such as this, in some implementations, act 703 may be modified so that instead of using the "center" of the image as the target location for objects of interest, the target location may be determined as the location of objects of interest defined by the average location of an object of interest across all images. In general, the target location may be varied to target objects of interest at arbitrary offset (e.g., around the middle of an image, offset in the left third of an image, etc.)

The ranking scores may be biased towards the images in which commonly occurring objects tend to be centered in the image (act 706). In this manner, images with centered objects of interest will tend to receive higher ranking scores.

Other post-processing operations may be performed in addition to or alternatively to the facial detection and object centering operations. Specifically, other query independent measures of quality may be applied to each image. For example, each image may be examined to determine a metric relating to how much of the image is in focus, how well the colors are distributed within the image, the amount of contrast within the image, etc. Images that are in-focus or that have a good color distribution may have their ranking scores biased upwards.

Referring back to FIG. 5, refinement component 415 may next order the images in the set based on the ranking scores (act 510). For example, the images may be sorted based on their ranking scores and the top M (M greater than or equal to one) of the sorted images may be returned to the user as results of an image search. In this manner, the initial set of images are ranked and a subset of the images are selected based on the rankings. Ideally, the order of the sorted set of images will correspond to an image ordering in which the images near the top are the images that are most representative of the images in the initial set.

Although the ranking scores were described above as being calculated in terms of overlap of features between images, in some implementations, the absolute or relative geometric placement of the image features can also be taken into consideration. For example, it may be desirable to emphasize images in which the features of interest tend to be in geometrically similar locations within an image. In addition to geometric placement, image size, orientation, and image scale may also be considered. For instance, it may be desirable to emphasize objects of interest that take up a large relative portion of an image. Additionally, it may be desirable to take into account the amount of clutter in an image that is outside of the object(s) of interest. For example, an image that includes a dominant object of interest and relatively few additional objects of interest may be preferred to another image that includes the dominant object of interest but that also includes a number of other objects.

Additionally, although the initial feature comparison (act 505) and post-processing functions (act 509) were described as occurring in different operations, it can be appreciated that in some implementations these operations can be simultaneously taken into account. For instance, the ranking scores for an image may be computed as a weighted sum of the image_score calculation in act 505 and the post-processing operations in act 509. For example, if a single "in-focus" post processing calculation is performed, the ranking score may be computed as: a*image_score+b*in_focus_score; where a and b represent weighting factors (e.g., a may be selected to be three and b may be selected to be one) and the "in_focus_score" represents the score for the in-focus post-processing operation.

Exemplary Applications

Refinement component 415 has been primarily described in the context of an image search engine in which refinement component 415 may re-rank or re-order a set of images returned from an image search component. The reordered images will tend to be in an order in which more representative images or higher quality images will gravitate to the top of the order. Accordingly, when the images are presented to the user, the first images shown to the user will be the more representative/higher quality images. In the example of FIG. 1, for instance, images 100, 110, and 112 will likely be presented first to the user followed by image 111. Image 113 may be presented last to the user or may be pruned (removed) from the set of images presented to the user.

Refinement component 415 may be employed in contexts other than a general image search engine. In general, any application in which images are to be ranked or in which a subset of an initial set of images are to be selected may be an application that is appropriate for application of refinement component 415. For example, in an image search performed by a user using a mobile device, in which the display area is limited, it may be desirable to prune the number of images returned to the user to some small number (e.g., 5).

Refinement component 415 may additionally be used in situations in which it is desirable to find a single most representative image from a set of images. For example, in a product search engine or a news search engine, it may be desirable to display a single image next to a product listing or next to a news article. For a product search engine, for instance, the name of the product may be used as a search query to return an initial set of possible product images. Refinement component 415 may be used as described above to rank the initial set of product images. The single highest ranking product image may be chosen to display next to the product listing. Similarly, for a news article search engine, selected text from the news article may be used as a search query to return an initial set of possible images. Refinement component 415 may be used as described above to rank the initial set of images. The single highest ranking image may be chosen to display next to the news listing.

CONCLUSION

As described above, a set of images are processed to rank the images using techniques that tend to identify images that are of good quality and that are representative of the set of images. The ranking of images in the manner described herein can be useful in a number of possible applications, such as in improving image search results and in identifying a "best" representative image to show to a user.

The foregoing description of exemplary embodiments of the invention provides illustration and description, but is not intended to be exhaustive or to limit the invention to the precise form disclosed. Modifications and variations are possible in light of the above teachings or may be acquired from practice of the invention.

Moreover, while a series of acts have been described with regard to FIGS. 5-7, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "components" or "models" that performs one or more functions. This elements may be implemented as hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The invention claimed is:

1. A method comprising:
   obtaining, by one or more processors, a set of images;
   comparing, by one or more processors, each image in the set of images to a particular image in the set of images based on at least one predetermined feature;
   ranking, by one or more processors and based on the comparing, the set of images;
   receiving, by one or more processors and after ranking the set of images, a search query to identify an image;
   comparing, by one or more processors, information regarding the search query to the ranked set of images; and
   providing for presentation, by one or more processors, at least one image in the ranked set of images.

2. The method of claim 1, where the at least one predetermined feature includes an image feature based on at least one of:
   an intensity of the images,
   a color of the images,
   one or more edges in the images, or
   a texture of the images.

3. The method of claim 1, where the at least one predetermined feature includes an intensity of the images, the method further comprising:
   dividing each image, in the set of images, into one or more portions; and
   determining an intensity histogram for each of the one or more portions, and
   where, when comparing each image in the set of images to the particular image in the set of images, the method includes:
      comparing each image in the set of images to the particular image in the set of images based on the determined intensity histogram.

4. The method of claim 1, where the at least one predetermined feature includes a color feature of the images, the method further comprising:
   dividing each image, in the set of images, into one or more portions; and
   determining a color histogram for each of the one or more portions, and
   where, when comparing each image in the set of images to the particular image in the set of images, the method includes:
      comparing each image in the set of images to the particular image in the set of images based on the determined color histogram.

5. The method of claim 1, further comprising:
   determining one or more areas within each image; and
   determining a histogram for each of the one or more areas,
   where, when comparing each image in the set of images to the particular image in the set of images, the method includes:
      comparing each image in the set of images to the particular image in the set of images based on the determined histogram.

6. The method of claim 1, where ranking the set of images includes:
   assigning a respective ranking score to each image in the set of images, the respective ranking score representing a similarity between an image in the set of images and the particular image in the set of images based on the at least one predetermined feature.

7. The method of claim 1, where providing, for presentation, the at least one image in the ranked set of images includes at least one of:
   providing, for presentation, a document that includes the at least one image; or
   providing, for presentation, a document that includes a link to the at least one image.

8. A system comprising:
   one or more server devices to:
   obtain a set of images;
   compare each image in the set of images to a particular image in the set of images based on at least one predetermined feature;
   rank, based on the comparing, the set of images;
   receive, after ranking the set of images, a search query to identify an image;
   compare information regarding the search query to the ranked set of images; and
   provide, for presentation, at least one image in the ranked set of images.

9. The system of claim 8, where the at least one predetermined feature includes an image feature based on at least one of:
   an intensity of the images,
   a color of the images,
   one or more edges in the images, or
   a texture of the images.

10. The system of claim 8, where the at least one predetermined feature includes an intensity of the images, and one or more server devices are further to:
    divide each image, in the set of images, into one or more portions; and
    determine an intensity histogram for each of the one or more portions, and
    where, when comparing each image in the set of images to the particular image in the set of images, the one or more server devices are further to:
    compare each image in the set of images to the particular image in the set of images based on the determined intensity histogram.

11. The system of claim 8, where the at least one predetermined feature includes a color feature of the images, and one or more server devices are further to:
    divide each image, in the set of images, into one or more portions; and
    determine a color histogram for each of the one or more portions, and
    where, when comparing each image in the set of images to the particular image in the set of images, the one or more server devices are further to:
    compare each image in the set of images to the particular image in the set of images based on the determined color histogram.

12. The system of claim 8, where the one or more server devices are further to:
    determine one or more areas within each image; and
    determine a histogram for each of the one or more areas,
    where, when comparing each image in the set of images to the particular image in the set of images, the one or more server devices are further to:
    compare each image in the set of images to the particular image in the set of images based on the determined histogram.

13. The system of claim 8, where, when ranking the set of images, the one or more server devices are further to:
    assign a respective ranking score to each image in the set of images, the respective ranking score representing a similarity between an image in the set of images and the particular image in the set of images based on the at least one predetermined feature.

14. The system of claim 8, where, when providing, for presentation, the at least one image in the ranked set of images, the one or more server devices are further to:
    provide, for presentation, a document that includes the at least one image; or
    provide, for presentation, a document that includes a link to the at least one image.

15. A device comprising:
    one or more processors to:
    obtain a set of images;
    compare each image in the set of images to a particular image in the set of images based on at least one predetermined feature;
    rank, based on the comparing, the set of images;
    receive, after ranking the set of images, a search query to identify an image;
    compare information regarding the search query to the ranked set of images; and
    provide, for presentation, at least one image in the ranked set of images.

16. The device of claim 15, where the at least one predetermined feature includes an image feature based on at least one of:
    an intensity of the images,
    a color of the images,
    one or more edges in the images, or
    a texture of the images.

17. The device of claim 15, where the at least one predetermined feature includes a color feature of the images, and one or more processors are further to:
    divide each image, in the set of images, into one or more portions; and
    determine a color histogram for each of the one or more portions, and
    where, when comparing each image in the set of images to the particular image in the set of images, the one or more processors are further to:
    compare each image in the set of images to the particular image in the set of images based on the determined color histogram.

18. The device of claim 15, where the one or more processors are further to:
    determine one or more areas within each image; and
    determine a histogram for each of the one or more areas,
    where, when comparing each image in the set of images to the particular image in the set of images, the one or more processors are further to:
    compare each image in the set of images to the particular image in the set of images based on the determined histogram.

19. The device of claim 15, where, when ranking the set of images, the one or more processors are further to:
    assign a respective ranking score to each image in the set of images, the respective ranking score representing a similarity between an image in the set of images and the particular image in the set of images based on the at least one predetermined feature.

20. The device of claim 15, where, when providing, for presentation, the at least one image in the ranked set of images, the one or more processors are further to:
    provide, for presentation, a document that includes the at least one image; or provide, for presentation, a document that includes a link to the at least one image.

* * * * *

UNITED STATES PATENT AND TRADEMARK OFFICE
CERTIFICATE OF CORRECTION

PATENT NO. : 8,498,490 B1
APPLICATION NO. : 13/301449
DATED : July 30, 2013
INVENTOR(S) : Shumeet Baluja et al.

It is certified that error appears in the above-identified patent and that said Letters Patent is hereby corrected as shown below:

Title Page
Please correct the Related U.S. Application Data (63) to read as follows:
Continuation of application No. 11/560,246, filed on Nov. 15, 2006, now Pat. No. 8,090,222.

Signed and Sealed this
Nineteenth Day of November, 2013

Teresa Stanek Rea
*Deputy Director of the United States Patent and Trademark Office*